United States Patent
Tran et al.

(10) Patent No.: US 10,230,416 B2
(45) Date of Patent: Mar. 12, 2019

(54) CARRIER FOR A PORTABLE COMMUNICATION DEVICE

(71) Applicant: MOTOROLA SOLUTIONS, INC., Chicago, IL (US)

(72) Inventors: Chi T Tran, Weston, FL (US); Chung Meng Chew, Perak (MY); Kuang Eng Lim, Penang (MY); Ban Hin Ooi, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/746,344

(22) PCT Filed: Aug. 7, 2015

(86) PCT No.: PCT/MY2015/000064
§ 371 (c)(1),
(2) Date: Jan. 19, 2018

(87) PCT Pub. No.: WO2017/026884
PCT Pub. Date: Feb. 16, 2017

(65) Prior Publication Data
US 2018/0219570 A1    Aug. 2, 2018

(51) Int. Cl.
*H04M 1/03*    (2006.01)
*H04M 1/04*    (2006.01)
(Continued)

(52) U.S. Cl.
CPC ........... *H04B 1/3877* (2013.01); *H04B 1/385* (2013.01); *H04B 1/3888* (2013.01);
(Continued)

(58) Field of Classification Search
CPC .... H04B 1/385; H04B 1/3877; H04B 1/3888; H04B 2001/3855; H04M 1/2055; H04M 1/035; H04M 1/04
See application file for complete search history.

(56) References Cited

U.S. PATENT DOCUMENTS 7,050,600 B2 *  5/2006  Saiki ...................... H04M 1/03
                                                  381/186
8,098,867 B2    1/2012  Hampton et al.
(Continued)

OTHER PUBLICATIONS

Speck, Turn up the Volume with Candyshell Amped From Speck Sound Amplification Case for iPhone 5/5s, website (2018) Samsonite IP Holdings, http://www.speckproducts.com/uk/press/turn-up-the-volume-with-candyshell-amped-from-speck-sound-amplification-case-for-iphone-5-5s.
(Continued)

*Primary Examiner* — Simon Nguyen
(74) *Attorney, Agent, or Firm* — Barbara R. Doutre; Michael Best & Friedrich LLP (57) ABSTRACT

A method and apparatus for carrying a portable communication device. The portable communication device includes a housing, a screen supported by the housing, and a speaker supported by the housing. A carrier releasably supports the portable communication device. The carrier includes a body having a first end, a second end opposite the first end, and a surface extending between the first and second ends. The screen of the portable communication device faces the surface of the body. The surface is spaced apart from me screen to form an acoustic tunnel between the screen and the surface. The speaker of the portable communication device directs sound into the acoustic tunnel.

22 Claims, 5 Drawing Sheets

(51) Int. Cl.
    *H04M 1/18*     (2006.01)
    *H04B 1/3827*     (2015.01)
    *H04B 1/3877*     (2015.01)
    *H04B 1/3888*     (2015.01)
    *H04M 1/05*     (2006.01)

(52) U.S. Cl.
    CPC .............. *H04M 1/035* (2013.01); *H04M 1/04* (2013.01); *H04B 2001/3855* (2013.01); *H04M 1/05* (2013.01); *H04M 1/185* (2013.01)

(56) References Cited

U.S. PATENT DOCUMENTS

| | | | |
|---|---|---|---|
| 8,767,992 B2 | 7/2014 | Lester, Jr. | |
| 2005/0265574 A1* | 12/2005 | Holmes | H04M 1/0266 381/388 |
| 2007/0123317 A1 | 5/2007 | Nguyen et al. | |
| 2012/0118773 A1 | 5/2012 | Rayner | |
| 2013/0063004 A1* | 3/2013 | Lai | G06F 1/1688 312/223.1 |
| 2014/0141846 A1* | 5/2014 | Weaver, III | H04M 1/04 455/575.1 |

OTHER PUBLICATIONS

Nexus, "Seidio Spring-Clip Holster for Nexus 6," website (2018) Smartphone Experts USA LLC, http://www.shopandroid.com/seidio-spring-clip-holster/4A24A20174.htm.
PCT/MY2015/000064 International Search Report and Written Opinion of the International Searching Authority dated May 3, 2016 (14 pages).
Office Action from the German Patent and Trademark office for Application No. 10 2015 006 786.8 dated May 7, 2018 (12 pages).

* cited by examiner

CARRIER FOR A PORTABLE COMMUNICATION DEVICE

BACKGROUND OF THE INVENTION

Portable communication devices, such as two-way radios are often carried by users at waist level, for example within a belt worn with holsters, for convenience as well as ease of carrying. The distance from the belt to the ear in such a case, however, may make it difficult to hear sound coming from the portable communication device. Some users make up for this diminished audio at the ear by operating the portable communication device at a high output volume. One drawback of the higher volume is the lack of privacy and distraction to others nearby. Other users, alternatively, make up for the diminished audio levels at the ear by utilizing remote speaker microphones. One drawback of remote speaker microphones are the additional required wires, weight, and complexity.

Accordingly, there is a need for a carrier for a portable communication device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one embodiment, a system comprises a portable communication device including a housing, a screen supported by the housing, and a speaker supported by the housing. The system also comprises a carrier releasably supporting the portable communication device. The carrier includes a body having a first end, a second end opposite the first end, and a surface extending between the first and second ends. The screen of the portable communication device faces the surface of the body. The surface is spaced apart from the screen to form an acoustic tunnel between the screen and the surface. The speaker of the portable communication device directs sound into the acoustic tunnel.

Figure 1:
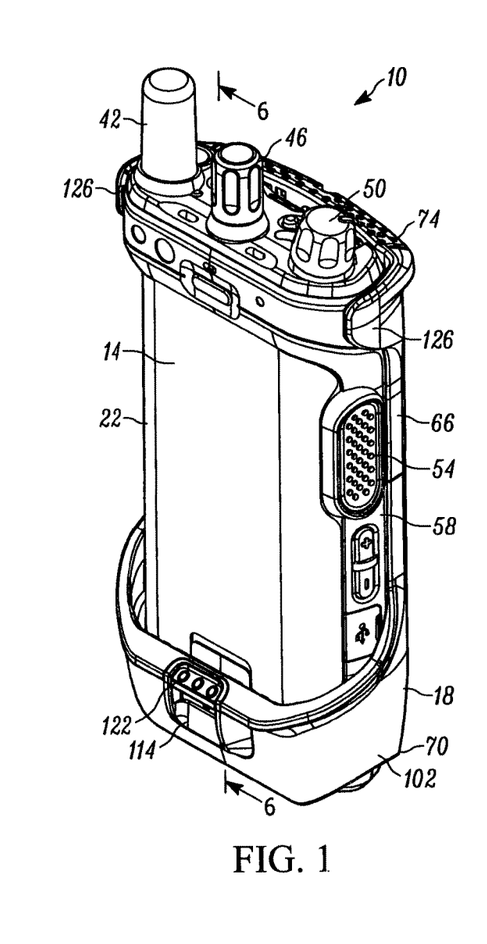
FIG. 1 is a front perspective view of a portable communication device and a carrier embodying the invention.
Figure 2:
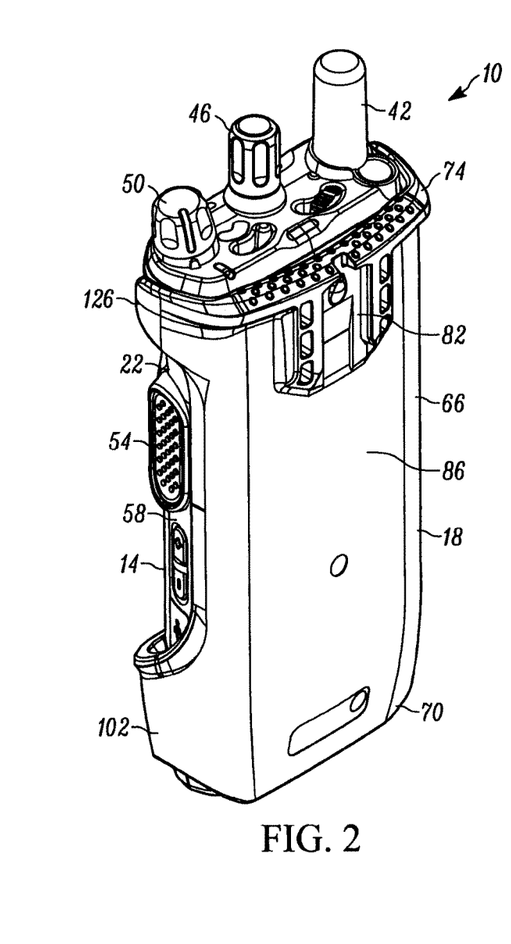
FIG. 2 is a rear perspective view of the portable communication device and the carrier.
Figure 3:
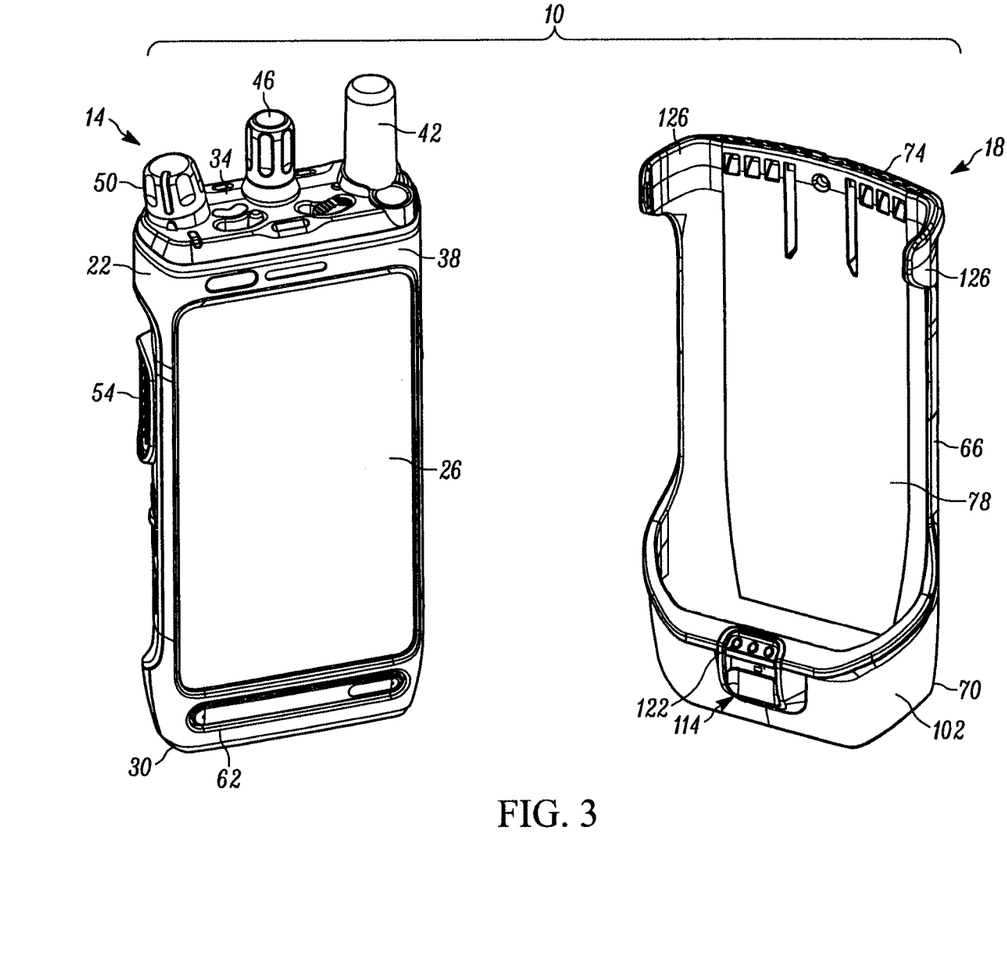
FIG. 3 is an exploded perspective view of the portable communication device and the carrier.

FIGS. 1-3 illustrate various views of a system 10 including a portable communication device 14 and a carrier 18. The illustrated portable communication device 14 is a two-way radio. In other embodiments, the portable communication device 14 may be, for example, a cellular telephone, a smart telephone, a tablet, or a digital audio player. The carrier 18 receives the portable communication device 14 to support and help protect the portable communication device 14. In the illustrated embodiment, the carrier 18 is a holster that can clip onto a belt (or other location) of a user. The carrier 18 allows a user to carry the portable communication device 14 without holding the portable communication device 14 in or with the user's hands.

As shown in FIGS. 1 and 3, the portable communication device 14 includes a housing 22 and a display or screen 26 (FIG. 3). The housing 22 includes a lower end 30, an upper end 34, and a front 38. The screen 26 is supported by the front 38 of the housing 22. The illustrated screen 26 extends between the lower and upper ends 30 and 34 of the housing 22 and covers almost the entire front 38 of the housing 22. In other embodiments, the screen 26 may only cover a portion of the front 38 of the housing 22. The screen 26 displays information related to the operation of the portable communication device 14. In some embodiments, the screen 26 may be a liquid crystal display (LCD) screen, a light emitting diode (LED) screen, an organic light emitting diode (OLED) screen, or other screen.

The illustrated portable communication device 14 also includes an antenna 42 and knobs, buttons, and other controls for controlling operation of the portable communication device 14. The antenna 42 extends from the upper end 34 of the housing 22. In one embodiment, a first knob 46 and a second knob 50 also extend from the upper end 34 of the housing 22. The first knob 46 is a tuner or channel select control that is used to change a channel of the portable communication device 14. The second knob 50 is a volume control that is used to change an output volume of the portable communication device 14. In the illustrated embodiment, the first and second knobs 46, 50 are rotatable dials, although other suitable actuators may alternatively be employed. A button 54 is positioned along a side 58 of the housing 22. In the embodiment shown, the button 54 is a push-to-talk button used by a user to initiate a voice transmission from the portable communication device 14. In the illustrated embodiment, the button 54 is a push button, although other suitable controls may alternatively be employed.

As shown in FIG. 3, the portable communication device 14 further includes a speaker 62. It should be readily apparent that reference number 62 points to a speaker port rather than the actual speaker, and that the actual speaker is positioned within the housing 22. The term "speaker" as used herein refers to both the actual speaker and the speaker port to simplify explanation of the invention. The speaker 62 is supported by the housing 22 adjacent the lower end 30. More specifically, the speaker 62 is positioned on the front 38 of the housing 22 and at a position on the front 38 that is lower than the screen 26. The speaker 62 outputs sounds from the portable communication device 14.

The carrier 18 releasably supports the portable communication device 14. As noted above, the carrier 18 facilitates carrying the portable communication device 14 by a user without the need of the user to carry or hold the portable communication device 14 in or with the user's hands. The illustrated carrier 18 includes a body 66 having a first end 70, a second end 74 opposite the first end 70, and a surface 78 extending between the first and second ends 70 and 74. When the portable communication device 14 is supported by the carrier 18 (as shown in FIGS. 1 and 2), the first end 70 of the carrier 18 is adjacent the lower end 30 (FIG. 3) of the portable communication device 14, and the second end 74 of the carrier 18 is adjacent the upper end 34 of the portable communication device 14. As shown in FIG. 2, an attachment structure 82 is formed on a rear 86 of the body 66 adjacent the second end 74. The attachment structure 82 is configured to couple various accessories, such as, for example, a belt clip, to the carrier 18.

Figure 4:
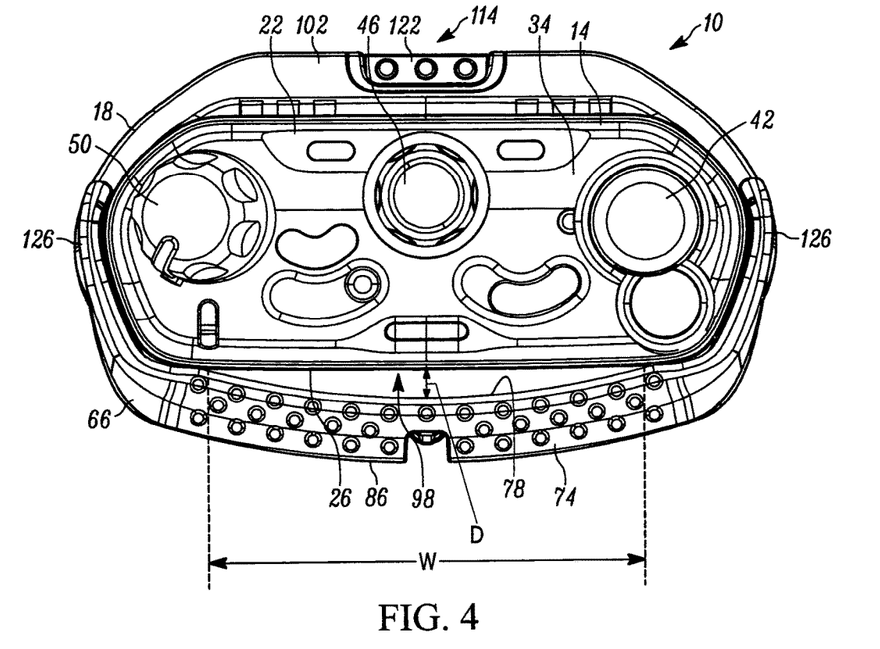
FIG. 4 is an end view of the portable communication device and the carrier.
Figure 5:
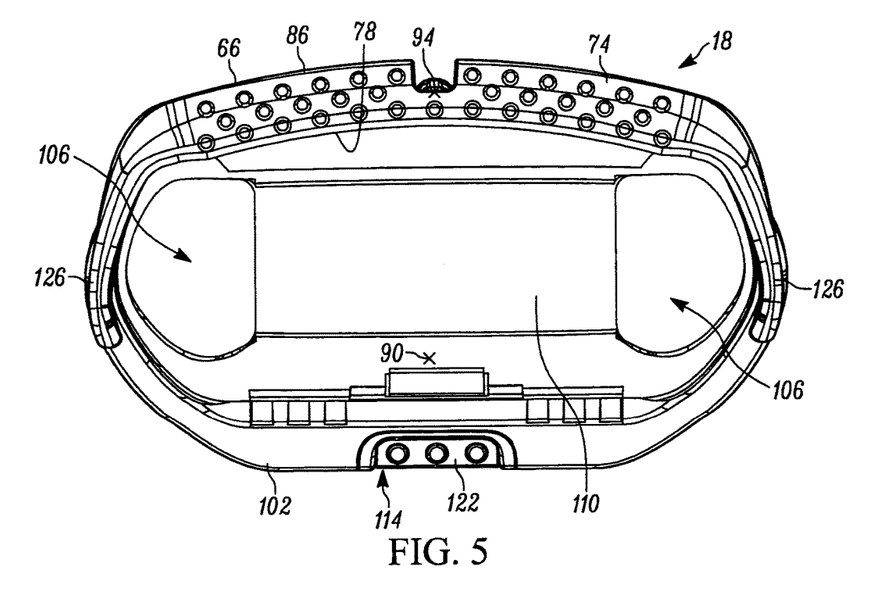
FIG. 5 is an end view of the carrier without the portable communication device.
Figure 6:
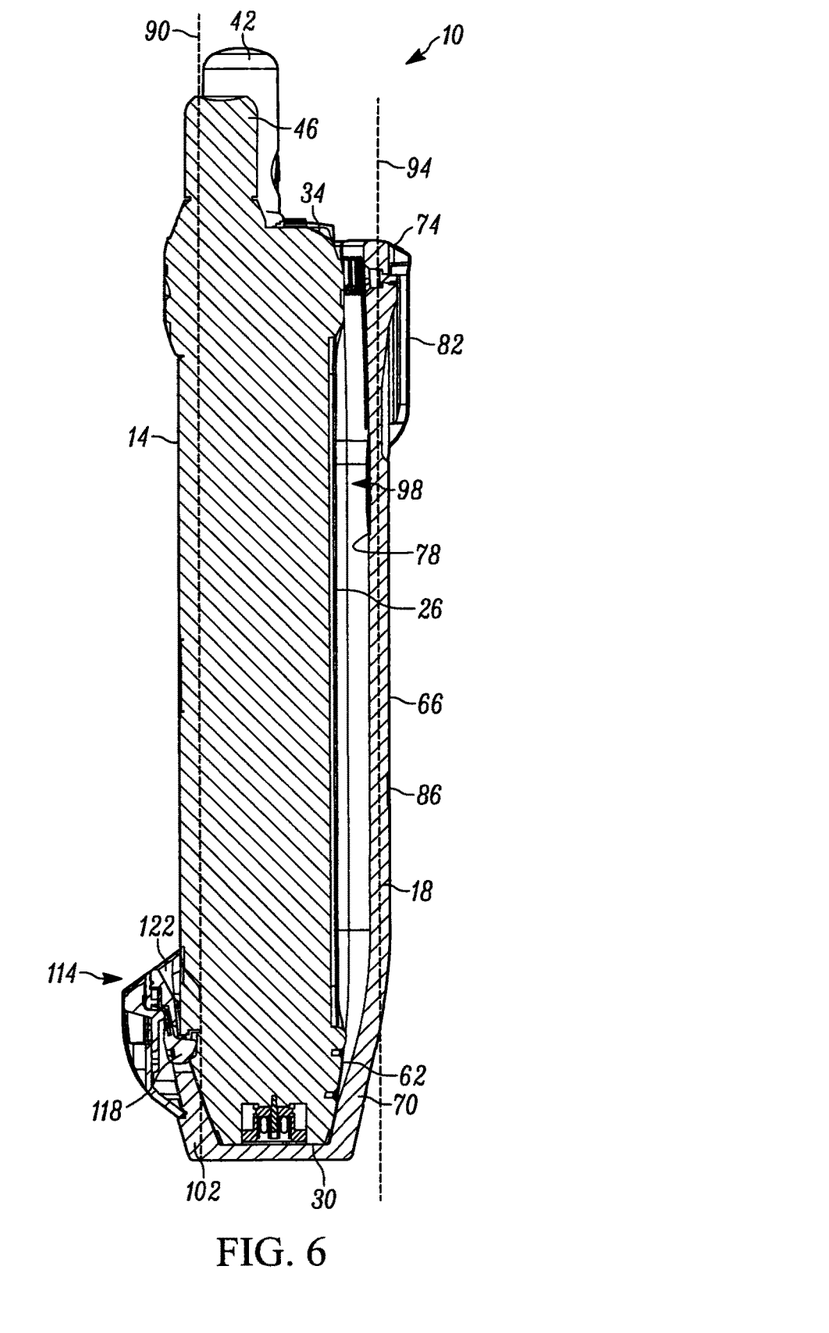
FIG. 6 is a cross-sectional view of the portable communication device and the carrier taken along section line 6-6 of FIG. 1.

Referring to FIGS. 3-6, the surface 78 of the carrier 18 is a generally continuous surface formed on a side of the body 66 that faces the portable communication device 14 when the portable communication device 14 is supported by the carrier 18. As shown in FIG. 4, the surface 78 is shaped to be spaced apart from the portable communication device 14. In the illustrated embodiment, the surface 78 is concave, or bowed, away from the portable communication device 14. More specifically, as shown in FIGS. 5 and 6, the surface 78 is curved about an axis 90 that extends substantially parallel (i.e., within 10 degrees) to a longitudinal axis 94 of the body 66 (i.e., an imaginary axis extending through the first and second ends 70 and 74 of the body 66). The illustrated surface 78 has a generally constant radius of curvature. The surface 78 begins curving away from the portable communication device 14 near the first end 70 of the body 66, and maintains the constant radius of curvature through the second end 74 of the body 66. It should be noted that the portable communication device 14 is shown as a solid object in FIG. 6 (rather than explicitly illustrating all of the internal components) to simplify the drawings.

When the portable communication device 14 is supported by or located within the carrier 18, as shown in FIGS. 4 and 6, the screen 26 of the portable communication device 14 faces the surface 78 of the body 66. The surface 78 is spaced apart from the screen 26 to form an acoustic tunnel 98 between the screen 26 of the portable communication device 14 and the body 66 of the carrier 18. In certain exemplary embodiments, the acoustic tunnel 98 has a maximum depth D of at least 4.0 mm. The maximum depth D is a dimension of the acoustic tunnel 98 measured perpendicularly between the screen 26 and the surface 78 at a point where the surface 78 is furthest from the screen 26. To maintain a relatively thin profile of the carrier 18, the maximum depth D is at most, for example, about 10 mm. The acoustic tunnel 98 also has a width W (FIG. 4) that is generally equal to, but slightly less than the width of the portable communication device 14. The width W of the acoustic tunnel 98 is, thereby, variable depending on the size of a particular portable communication device and carrier. In certain exemplary embodiments, the width W is about 57 mm.

The acoustic tunnel 98 receives sound generated by the speaker 62 of the portable communication device 14. As shown in FIG. 6, the acoustic tunnel 98 is closed at the first end 70 of the body 66 where the body 66 abuts the lower end 30 of the portable communication device 14. The curvature of the illustrated acoustic tunnel 98 progressively tapers near the first end 70 of the body 66. In other words, the surface 78 of the carrier 18 is angled or curved toward the portable communication device 14 to close the acoustic tunnel 98. The closed end of the acoustic tunnel 98 forms an acoustic input port for sound being directed from the speaker 62 into the acoustic tunnel 98. The acoustic tunnel 98, however, is open at the second end 74 of the body 66 because the surface 78 remains spaced apart from the upper end 34 of the portable communication device 14. Sides of the acoustic tunnel 98 are formed by an interface between the body 66 of the carrier 18 and the housing 22 of the portable communication device 14 to minimize acoustic leak out of the acoustic tunnel 98. The speaker 62 of the portable communication device 14 is aligned to direct sound into the acoustic tunnel 98 near the first end 70 of the body 66 (i.e., directly above where the acoustic tunnel 98 is closed). The acoustic tunnel 98 redirects the sound from the speaker 62 across the screen 26 of the portable communication device 14 and toward the second end 74 of the body 66. The acoustic tunnel 98 is open adjacent the second end 74 of the body 66 to project the sound outward from the carrier 18.

The illustrated acoustic tunnel 98 is oriented to direct sound toward a user's ear when the carrier 18 is worn on a belt, for example, at the user's waist. In other words, the acoustic tunnel 98 generally directs the sound upward and away from the carrier 18. This arrangement helps maintain the volume (i.e., decibel level) of sound being output by the speaker 62 of the portable communication device 14 as the sound travels to the user. In tests, the acoustic tunnel 98 maintained the volume of sound experienced by a user wearing the carrier 18 on his/her belt at over 90% of the volume output by the speaker 62. In contrast, a user wearing the portable communication device 14 on his/her belt with a conventional belt clip and the speaker 62 facing outwardly (rather than into an acoustic tunnel) typically experienced over a 12% drop in volume from the volume of sound output by the speaker 62. In some scenarios, using the carrier 18 with the acoustic tunnel resulted in a 4 decibel increase in volume at a user's ear.

Spacing the surface 78 of the body 66 apart from the screen 26 also helps protect the screen 26. For example, if the portable communication device 14 and the carrier 18 are dropped, the acoustic tunnel 98 provides a "crush zone" into which the body 66 of the carrier 18 can deflect and/or deform. In particular, when a relatively hard object, such as a belt clip, is attached to the attachment structure 82 (FIG. 2) of the carrier 18, the hard object can create a large amount of pressure when the carrier 18 is dropped on the ground, a floor, or similar surface and lands on the hard object. The acoustic tunnel 98 provides space for the body 66 to move (e.g., bend or flex) toward the portable communication device 14 without contacting the screen 26. As such, the hard object is inhibited from impacting and damaging the screen 26.

As shown in FIGS. 3, 5, and 6, the carrier 18 also includes a receptacle 102. The illustrated receptacle 102 is configured to receive the lower end 30 of the portable communication device 14. In the illustrated embodiment, the receptacle 102 is cup-shaped and wraps around three sides and the bottom of the portable communication device 14. In other embodiments, the receptacle 102 may be a partial cup-shape that wraps around less than three sides of the portable communication device 14. The receptacle 102 is coupled to and extends from the first end 70 of the body 66. In the illustrated embodiment, the receptacle 102 is integrally formed as a single piece with the body 66. For example, the receptacle 102 and the body 66 may be formed together of molded plastic. In other embodiments, the receptacle 102 may be a separate element that is secured to the body 66 by fasteners or adhesives. As shown in FIG. 5, two apertures 106 are formed in a bottom 110 of the receptacle 102. The apertures 106 facilitate draining of water and other liquids and materials out of the receptacle 102. The apertures 106 also facilitate pushing the portable communication device 14 out of the receptacle 102 with a user's fingers.

Referring back to FIGS. 3 and 6, the illustrated carrier 18 also includes a latch mechanism 114. The latch mechanism 114 releasably engages the housing 22 of the portable communication device 14. In the illustrated embodiment, the latch mechanism 114 is positioned adjacent the first end 70 of the body 66. More particularly, the latch mechanism 114 is supported by the receptacle 102. In other embodiments, the latch mechanism 114 may be positioned elsewhere on the body 66 to engage the portable communication device 14, and/or the carrier 18 may include multiple latch mechanisms.

As shown in FIG. 6, the illustrated latch mechanism 114 includes a latch 118 and an actuator 122. The latch 118 engages (e.g., extends into an opening of) the housing 22 of the portable communication device 14 to secure the portable communication device 14 to the carrier 18. The actuator 122 is coupled to the latch 118 to selectively move the latch 118. Actuating the actuator 122 moves (e.g., pivots or rotates) the latch 118 out of engagement with the portable communication device 14 so that the portable communication device 14 is removable from the carrier 18. In the illustrated embodiment, the actuator 122 is a push button, although other suitable actuators may alternatively be employed. In some embodiments, the latch mechanism 114 includes a biasing member (e.g., a spring) that biases the latch 118 into engagement with the portable communication device 14. In such embodiments, the actuator 122 is operable to move the latch 118 against the bias of the biasing member. In other embodiments, other suitable latch mechanisms may also or alternatively be employed.

As shown in FIGS. 3-4, the carrier 18 further includes a pair of wings 126 extending from the second end 74 of the body 66. Similar to the receptacle 102, the illustrated wings 126 are integrally formed as a single piece with the body 66. The wings 126 engage opposing sides of the portable communication device 14 to help stabilize and releasably secure the portable communication device 14 to the carrier 18. Each wing 126 is configured to wrap partially around a side of the housing 22 of the portable communication device 14. The wings 126 are shaped to generally match the outer contour of the housing 22. In addition, the wings 126 can deflect to facilitate insertion and removal of the portable communication device 14 into and from the carrier 18.

Figure 7:
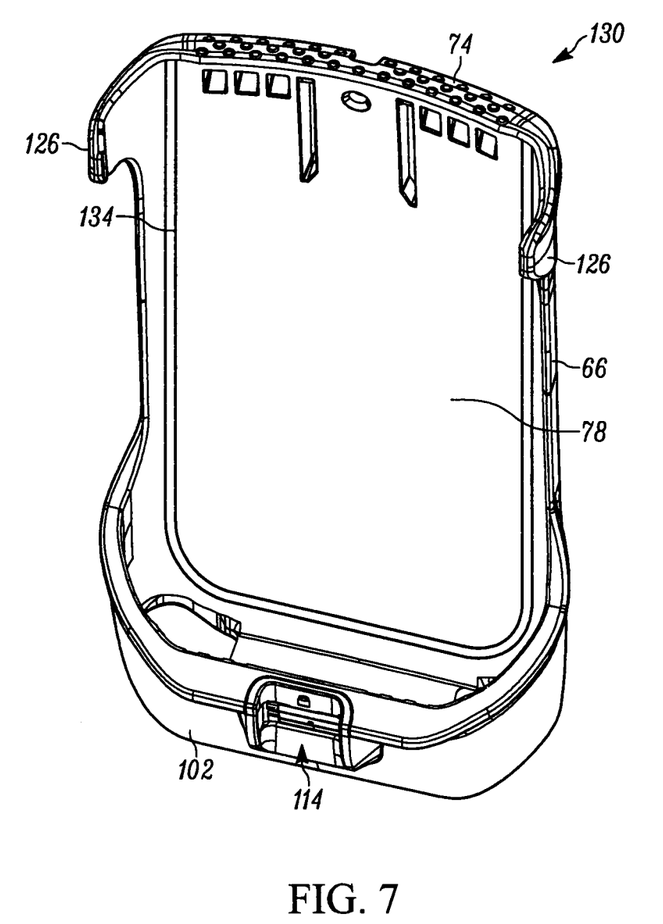
FIG. 7 is a front perspective view of a carrier without the portable communication device, the carrier including a gasket.

FIG. 7 illustrates another embodiment, in particular, a carrier 130. The carrier 130 is generally the same as the carrier 18 discussed above with reference to FIGS. 1-6, and like parts have been given the same reference numbers.

The illustrated carrier 130 includes a gasket 134 coupled to the body 66. The gasket 134 is generally U-shaped and defines a periphery of the concave surface 78. The gasket 134 is configured to engage the housing 22 of the portable communication device 14 to improve the interface or seal between the carrier 18 and the portable communication device 14. The improved seal reduces acoustic leak out of the sides of the acoustic tunnel 98. In some embodiments, the gasket 134 is a rubber strip that is overmolded onto the body 66 of the carrier 18. In other embodiments, the gasket 134 may be a separate element that is secured (e.g., glued) to the body 66 of the carrier 18.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
   a portable communication device including a housing, a screen supported by the housing, and a speaker supported by the housing; and a carrier releasably supporting the portable communication device, the carrier including a body having a first end, a second end opposite the first end, and a surface extending between the first and second ends;

wherein the screen of the portable communication device faces the surface of the body, the surface being spaced apart from the screen to form an acoustic tunnel between the screen and the surface, and wherein the speaker of the portable communication device directs sound into the acoustic tunnel.

2. The system of claim 1, wherein the speaker directs sound into the acoustic tunnel near the first end of the body, and wherein the acoustic tunnel directs the sound across the screen of the portable communication device toward the second end of the body.

3. The system of claim 2, wherein the acoustic tunnel is open at the second end of the body so that the sound travels out of the acoustic tunnel toward a user.

4. The system of claim 3, wherein the acoustic tunnel is closed at the first end of the body to form an acoustic input port for the speaker.

5. The system of claim 2, wherein the housing of the portable communication device includes a lower end supported adjacent the first end of the body and an upper end supported adjacent the second end of the body, and wherein the speaker is positioned adjacent the lower end.

6. The system of claim 5, wherein the portable communication device includes
an antenna extending from the upper end of the housing.

7. The system of claim 1, wherein the acoustic tunnel provides space for the body of the carrier to move toward the screen of the portable communication device without contacting the screen.

8. The system of claim 1, wherein the surface is concave away from the screen.

9. The system of claim 8, wherein the surface is curved about an axis that extends substantially parallel to a longitudinal axis of the body.

10. The system of claim 1, wherein the carrier further includes a latch mechanism supported by the body, and wherein the latch mechanism releasably engages the housing of the portable communication device.

11. The system of claim 1, wherein the carrier further includes a receptacle coupled to the first end of the body, and wherein the receptacle receives a lower end of the portable communication device.

12. The system of claim 1, wherein the carrier further includes a gasket connected to the body, and wherein the gasket engages the housing of the portable communication device to seal a periphery of the acoustic tunnel.

13. The system of claim 1, wherein the surface being spaced apart from the screen to form the acoustic tunnel is a concave surface that extends between the first and second ends.

14. A system comprising:
a portable communication device including a speaker and a screen; and
a carrier including
a body including a first end, a second end opposite the first end, and a concave surface extending between the first and second ends, and
a receptacle coupled to the first end of the body, the receptacle receiving a lower end of the portable communication device;

wherein the concave surface forms an acoustic tunnel between the body and the screen of the portable communication device when the lower end of the portable communication device is received in the receptacle, the acoustic tunnel being closed at the first end of the body and being open at the second end of the body, the acoustic tunnel configured to receive sound from the speaker of the portable communication device and direct the sound toward a user.

15. The system of claim 14, wherein the carrier further includes a latch mechanism configured to releasably engage the portable communication device, wherein the latch mechanism is supported by the receptacle.

16. The system of claim 14, wherein the concave surface tapers toward the portable communication device near the first end of the body.

17. The system of claim 14, wherein the carrier further includes a gasket coupled to the body, wherein the gasket defines a periphery of the concave surface.

18. A method of operating a portable communication device with a carrier, the portable communication device including a housing, a screen supported by the housing, and a speaker supported by the housing, the carrier including a body having a first end, a second end opposite the first end, and a surface extending between the first and second ends, the method comprising:
supporting the portable communication device with the carrier so that the screen of the portable communication device faces the surface, the surface being spaced apart from the screen to form an acoustic tunnel between the screen and the surface; and
directing sound from the speaker of the portable communication device into the acoustic tunnel.

19. The method of claim 18, wherein the acoustic tunnel is closed at the first end of the body and is open at the second end of the body, and wherein directing sound from the speaker includes directing the sound from the speaker of the portable communication device into the acoustic tunnel near the first end of the body.

20. The method of claim 19, further comprising directing the sound across the screen of the portable communication device and out of the acoustic tunnel toward a user.

21. The method of claim 18, wherein directing sound from the speaker includes directing the sound from the speaker of the portable communication device toward the surface of the carrier, and further comprising redirecting the sound with the surface toward a user.

22. The method of claim 18, wherein the surface being spaced apart from the screen to form the acoustic tunnel is a concave surface that extends between the first and second ends.

* * * * *